June 26, 1956     H. B. HEROD     2,751,737
DISC TYPE MOWING APPARATUS HAVING PIVOTED BLADES
Filed Sept. 25, 1953     6 Sheets-Sheet 5
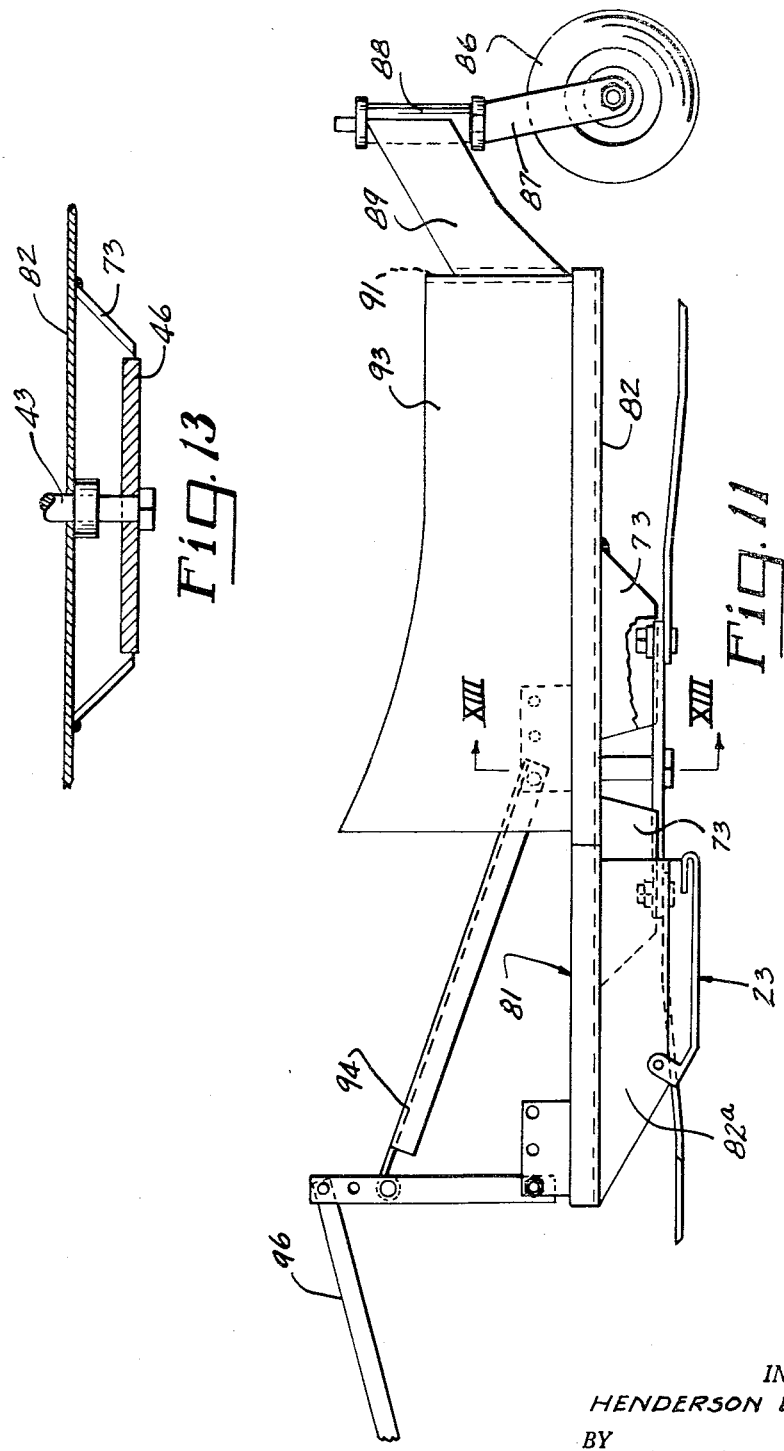
INVENTOR.
HENDERSON B. HEROD
BY
*Jennings & Carter*
ATTORNEYS

United States Patent Office 2,751,737
Patented June 26, 1956

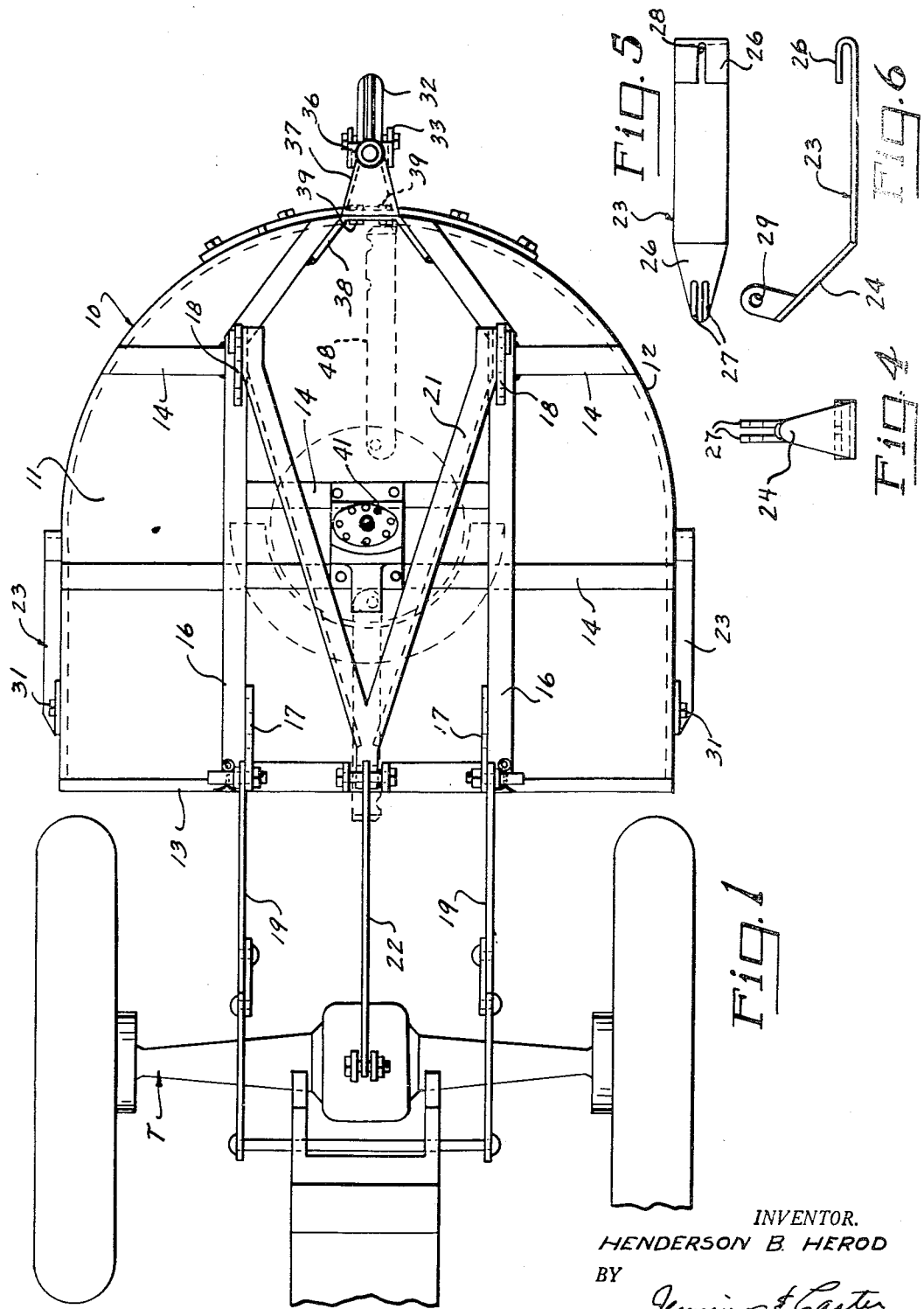

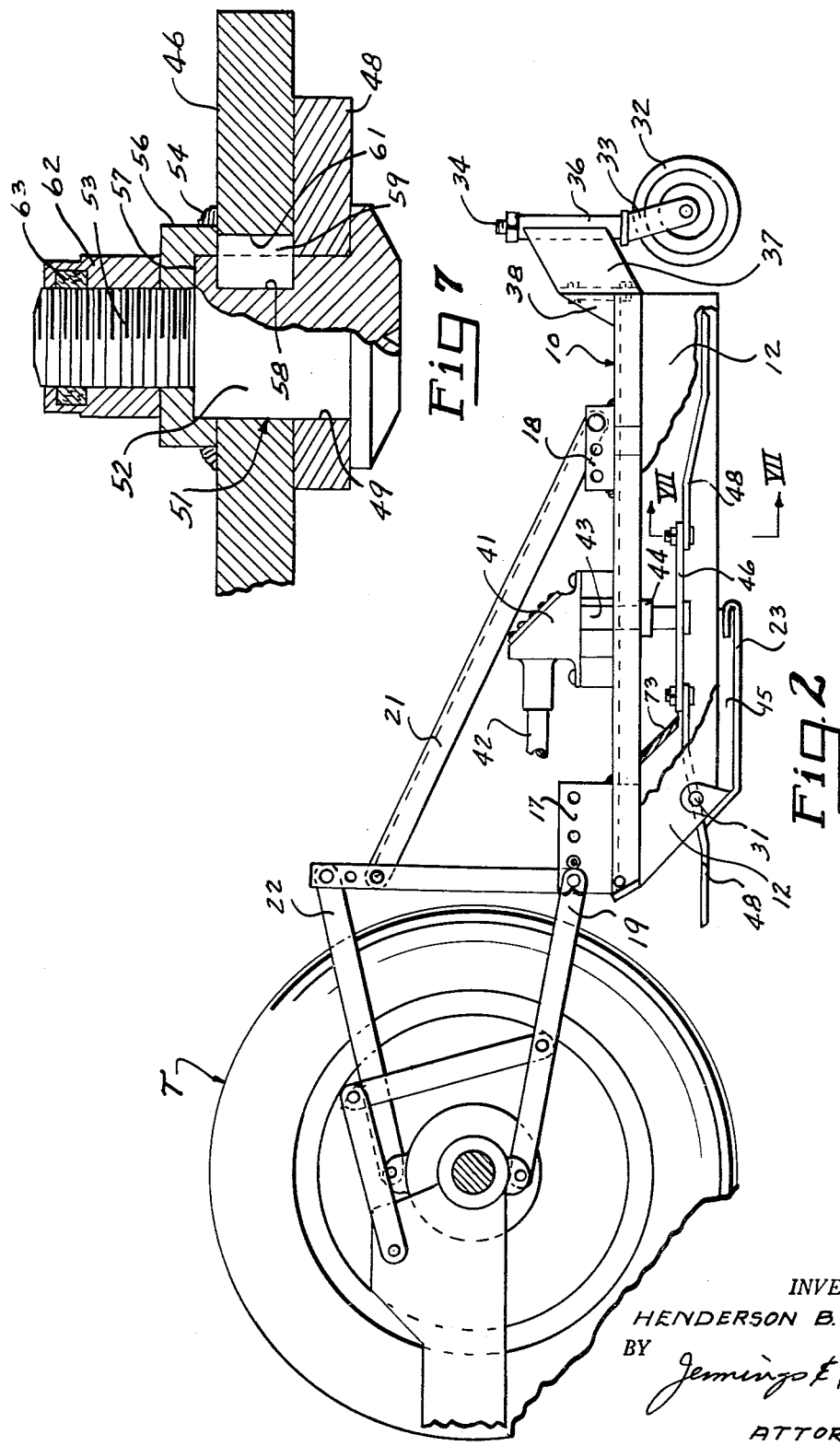

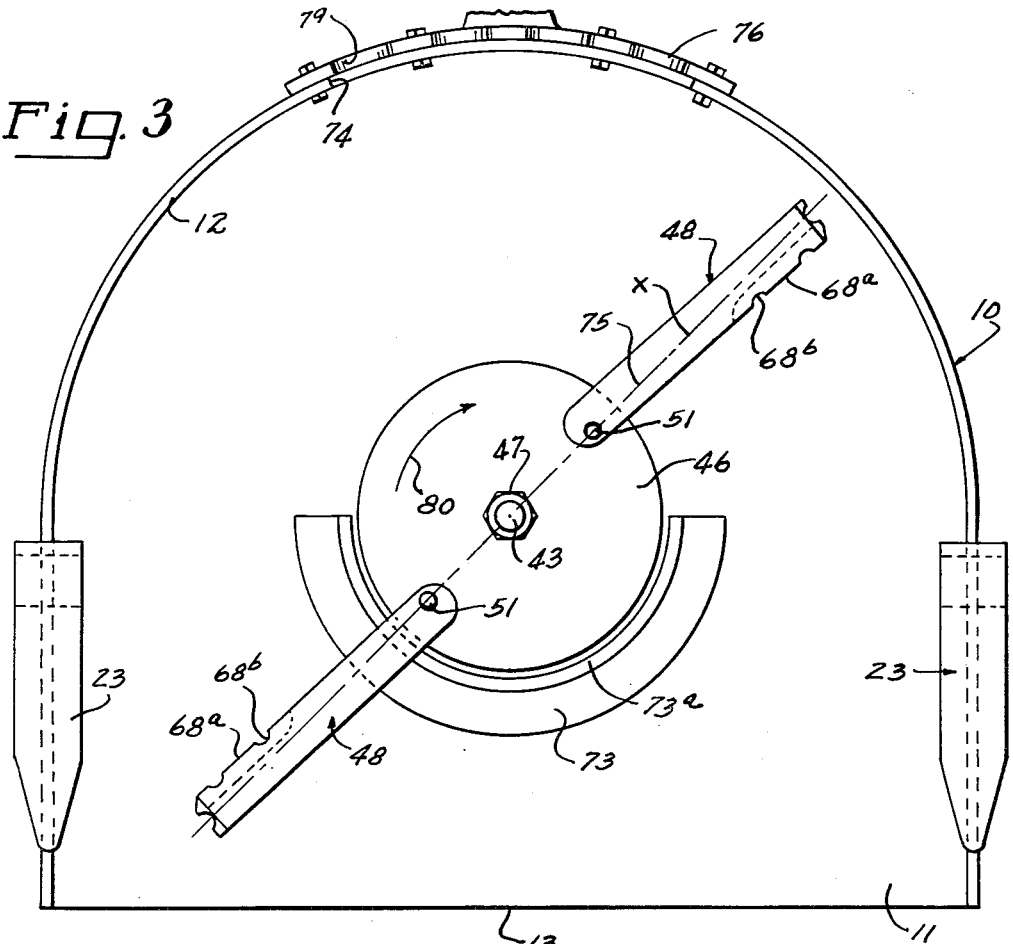
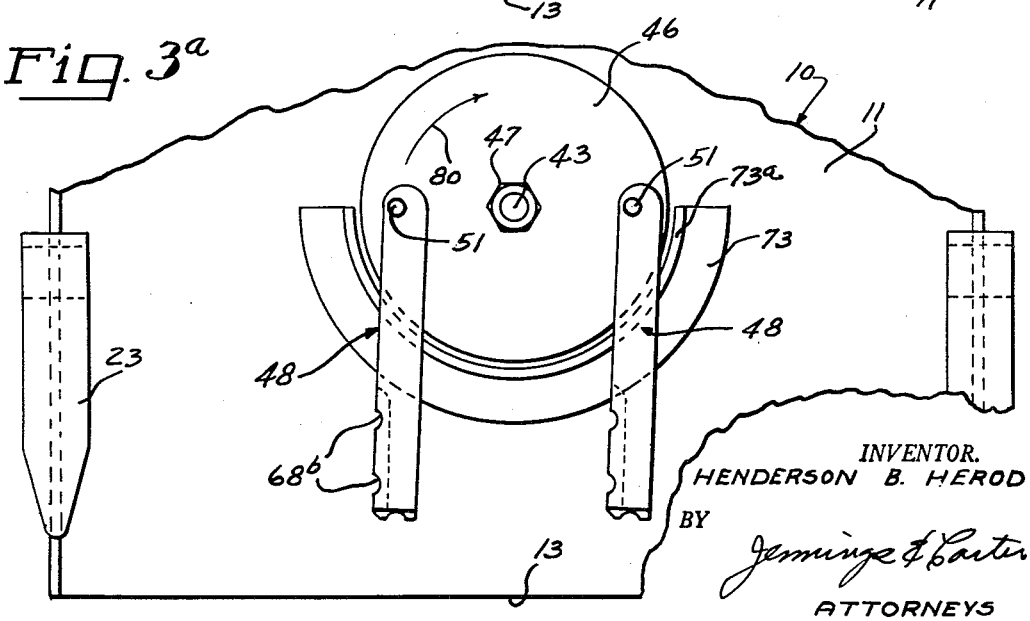

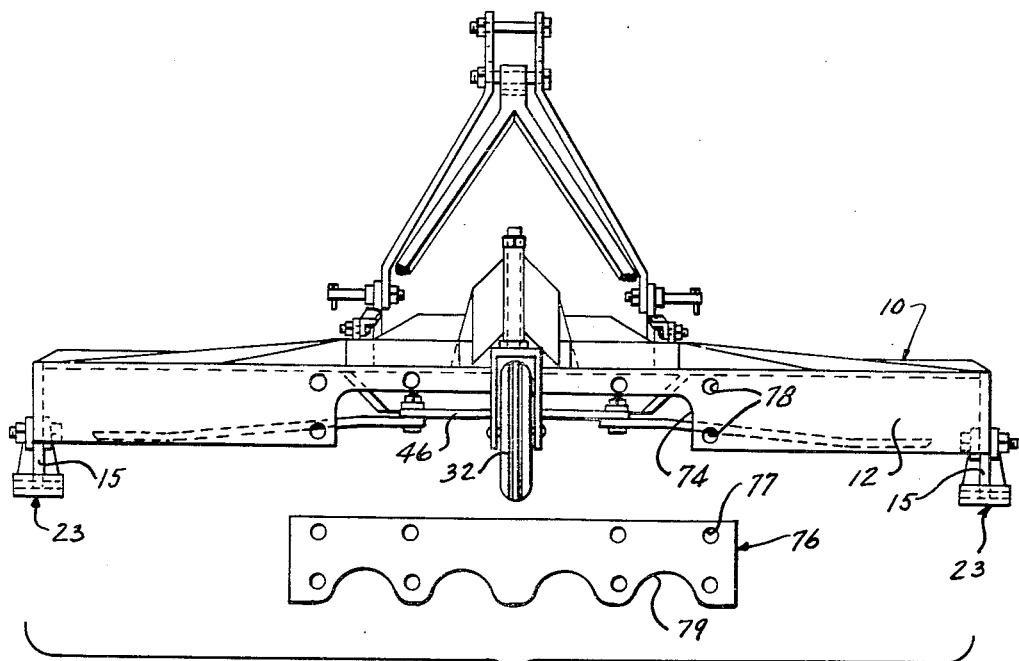
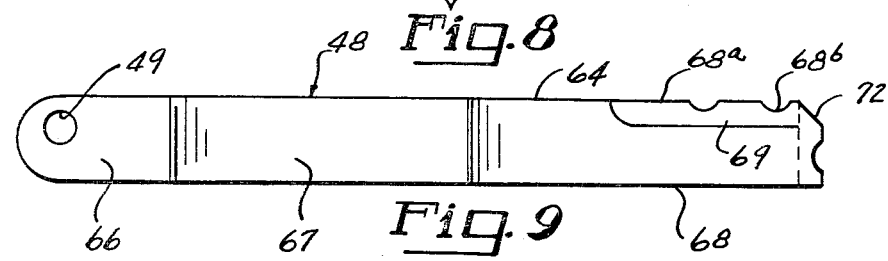
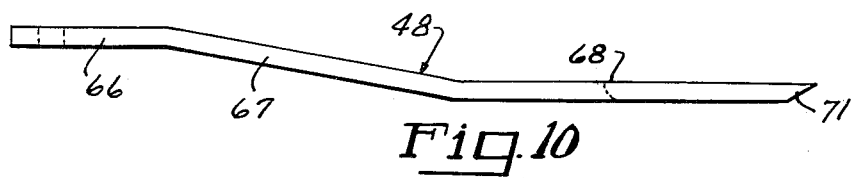

2,751,737
DISC TYPE MOWING APPARATUS HAVING PIVOTED BLADES

Henderson B. Herod, Montgomery, Ala.

Application September 25, 1953, Serial No. 382,406

2 Claims. (Cl. 55—62)

My invention relates generally to mowing apparatus of the type embodying horizontally rotatable cutting elements and in which the parts, including the cutting elements, are rugged enough to cut not only grass, weeds and the like but also which are effective to cut brush, small trees, stubble and the like, permitting the apparatus to be used for clearing of land.

More specifically, my invention relates to mowing apparatus of the character designated in which the cutting elements are pivotally mounted adjacent one end near the periphery of a relatively heavy disc, in turn suitably mounted for horizontal rotation in the frame of the apparatus, together with a downwardly sloping, arcuate member carried by the frame of the apparatus in position to prevent damage to the supporting and driving shaft for the cutter mechanism due to the shaft and cutter support means striking stumps, rocks, high places in the ground, and similar obstructions in the path of the machine as it is moved along.

Another object is to provide mowing apparatus embodying a horizontally rotatable blade carrying disc in combination with a downwardly sloping collar-like guard member carried by the frame and partially surrounding the disc on the advance side thereof, the collar extending low enough to cause the entire machine to ride up over obstructions such as stumps, rocks and the like in the path of the collar, whereby the rotating disc, its shaft, and the drive mechanism all are protected from damage which otherwise would occur.

Another object is to provide a mower embodying the foregoing features incorporated in a housing so designed that the machine may either be towed behind a vehicle or, if desired, may be forwardly mounted to be pushed into the growth to be cut, thus permitting the machine to be used to cut growth too heavy or dense for the propelling vehicle to traverse.

Another object is to provide mowing apparatus in which means is provided for varying the shredding action of the cutting means in the growth being cut while maintaining the cutting means at a constant height above the ground.

Another object is to provide a mower of the character designated in which the cutting blades are pivotally mounted on the supporting disc slightly off set relative to the longitudinal center line of the blades whereby the resultant force due to rotation of the blades causes them to assume and maintain positions during the cutting operation with the outer cutting edges slightly forwardly of radial lines passing through the center of rotation of the blade supporting member and the blade pivot points, whereby such blades, upon engaging an object to be cut, move axially relative to the object, affording not only a straight line impact cutting action but also a sawing action, smoothing out and improving the cutting action of the blades.

Another object is to provide a mower blade of the horizontal cutter type in which the outer cutting end thereof is beveled from its top surface downwardly toward its cutting edge, and in which its end is upwardly beveled, that is, oppositely to the bevel of the cutting edge, whereby in effect the blade has a definite amount of set, thus improving the cutting by affording relief for the blade in deep cuts when cutting relatively large diameter growth.

Apparatus illustrating the features of my invention is shown in the accompanying drawings forming a part of this application in which:

Fig. 1 is a plan view showing one form of my invention attached in towing position behind a tractor, the front portion of the tractor being broken away;

Fig. 2 is a side elevational view of the apparatus shown in Fig. 1, certain of the parts being broken away and in section;

Fig. 3 is an enlarged bottom view of the mowing apparatus shown in Figs. 1 and 2 with the blades in outwardly extended, cutting position;

Figure 12:
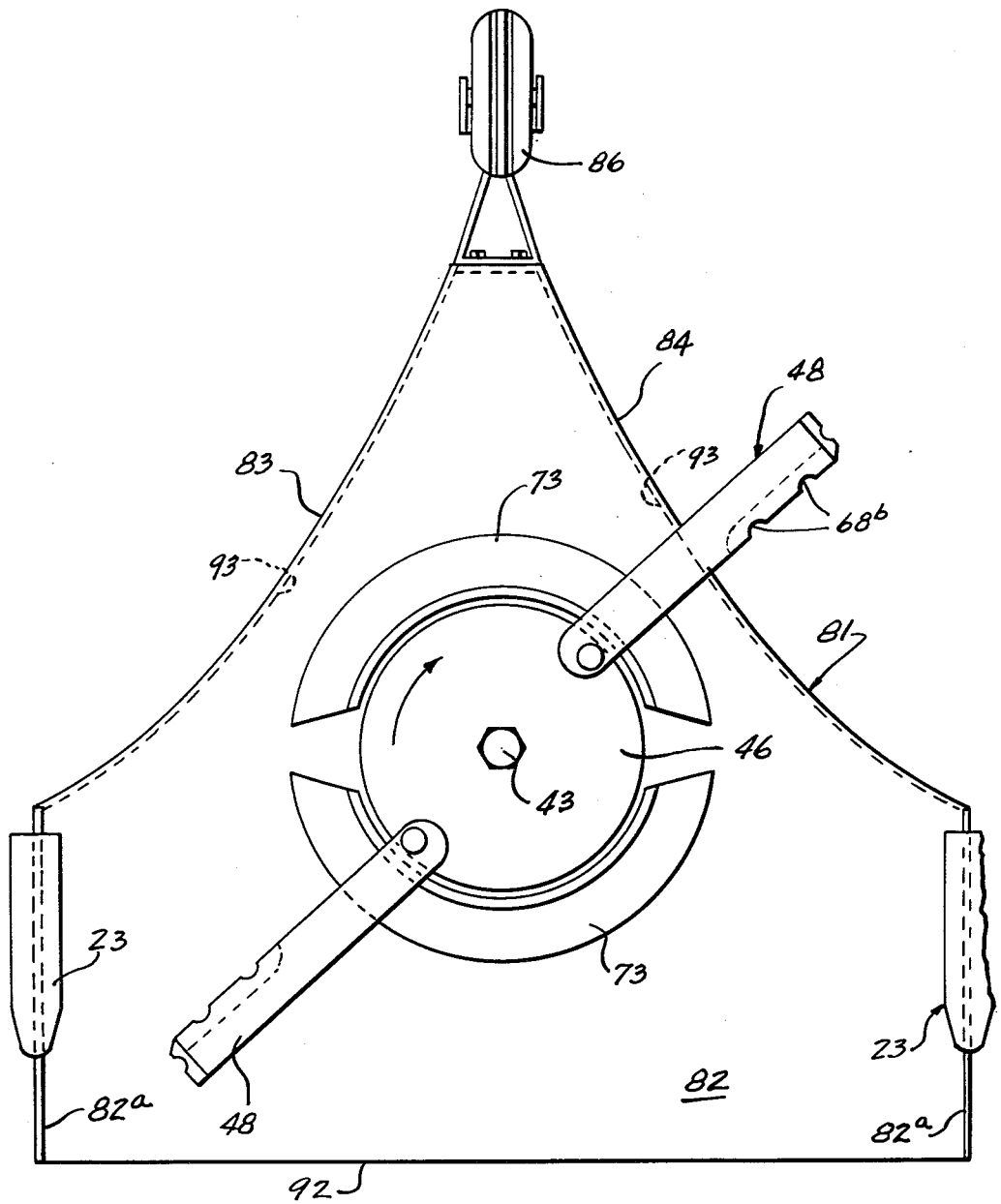

Fig. 3ᵃ is a fragmental detail bottom view illustrating the free pivotal mounting of the blades;

Fig. 4 is an enlarged front elevational view of one of the skid members detached from the remaining portion of the apparatus;

Fig. 5 is a plan view of one of the skids;

Fig. 6 is a side elevational view of one of the skids;

Fig. 7 is an enlarged detail sectional view taken generally along line VII—VII of Fig. 2 and illustrating a method of mounting the blades on the disc;

Fig. 8 is a rear view of the mower shown in the foregoing figures with a cover plate for an opening in the rear thereof shown in removed position;

Fig. 9 is a plan view of one of the cutting blades;

Fig. 10 is a side elevational view of the blades looking at the rear or non-cutting edge thereof;

Fig. 11 is a side elevational view of a mower having certain of the features of the mower shown in Figs. 1 to 10, inclusive, but embodying a different form of body, permitting the mower either to be towed or pushed into the growth to be cut;

Fig. 12 is a bottom view of the mower shown in Fig. 11; and,

Fig. 13 is a detail sectional view taken generally along line XIII—XIII of Fig. 11.

Referring now to the drawings for a better understanding of my invention and more particularly to Figs. 1 to 10, inclusive, I show a form of mowing machine embodying a body indicated generally by the numeral 10. As will be seen from the drawings, the body 10 comprises what may be termed an upper deck plate 11 and a downwardly depending flange or skirt 12 which extends around the periphery of the machine, except at the front end 13 thereof. Further, the mower body now being described is rounded at its back end as viewed in plan whereby the horizontally rotatable blades, later to be described, are substantially confined underneath the housing except at the front 13. The housing may also have on top of the plate suitable lateral cross braces 14 and longitudinally extending brace members 16.

Secured to the cross brace members are vertically disposed plates 17 at the front and 18 at the rear. Connected to these plates are the link members 19, 21 and 22, which sets of links serve to form a hitch for securing the mower in towing position behind a tractor, a portion of which is indicated by the letter T in the drawing. Because of the fact that the details of the hitch of itself form no part of my invention further description is believed to be unnecessary. Suffice it to say that the hitch is so arranged that the mower, as presently will appear, is permitted to accommodate itself to variations in the ground and to be pulled over obstructions such as rocks, stumps and the like.

The mower is supported adjacent its front end by means of a pair of skids 23 which may be in the form of elongated plates which have upturned forward ends 24 and an overbent rear end 26. The front end is provided with a pair of spaced lugs 27 adapted to receive between them the lower edge of the depending skirt of the mower body. The overbent end 26 may be provided with a notch 28 which hooks over the flanges of a T-iron 15 welded to lower edge of the skirt 12. The notch straddles the web of the T-iron. Suitable bolt holes 29 are provided in the lugs for passing a bolt 31 for removably securing the skids to the T-iron. This method of mounting the skids or shoes makes them readily replaceable when they become worn.

The rear rounded end of the mower may be supported by means of a caster type wheel 32 which is mounted in a U-shaped frame 33 carried on an axle 34. The axle 34 projects upwardly through a tubular bearing member 36. The bearing member may be secured by plate brackets 37 to an upstanding bracket 38 mounted on the rear of the mower. Suitable bolts 39 may be employed to remove or secure the supporting wheel bracket to the fixed bracket 38.

Mounted on the transverse cross members 14 adjacent the center of the frame of the apparatus is a gear box 41. The gear box 41 may have a power input shaft 42 which is driven through suitable universal joint connected shafts from a power source on the tractor, not shown. A vertically disposed output shaft 43 leading from the gear box 41 projects beneath the housing and carries the cutting mechanism. The shaft is supported by a suitable bearing 44 secured to the housing and is adapted to be driven at a speed suitable for the purposes at hand. Adjacent the lower end of the shaft 43 is a disc 46 of relatively thick metal, such as for instance, a thickness on the order of three quarters of an inch. The disc is non-rotatably secured to the shaft 43 by means of a nut 47 or the like.

Pivotally mounted to the disc 46 adjacent the periphery thereof are a pair of cutting blades 48. While any suitable means may be used to pivotally connect the blades 48 to the disc, I prefer the means shown more in detail in Fig. 7 of the drawing. It will be seen by reference of this figure that the blades 48 are provided with a mounting hole 49. Passing upwardly through the hole 49 is a bolt 51 having an enlarged lower section 52 and an upper, reduced threaded section 53. Welded to the top of the disc as at 54 is a member 56 which fits over the shoulder 57 formed at the junction of the portions 52 and 53 and which serves to limit upward movement of the bolt relative to the disc 46. The bolt is provided with a key seat 58. A key 59, fitting also in a key way 61 in an opening provided in the disc 46, holds the bolt non-rotatably relative to the disc. A nut 62 having a fiber locking insert 63 is employed to hold the parts assembled. With the mounting just described it will be apparent that a given clearance may be obtained between the head of the bolt and the bottom of the disc, thus mounting the blades 48 beneath the disc for free rotation about the large diameter portion of the bolt.

While various forms of blades may be employed in my improved apparatus I have found that a far smoother operation, more efficient cutting and generally improved results are obtained in the combination herein described if a blade of the type now to be described is employed. By reference to Figs. 9 and 10 it will be seen that the mounting hole 49 for the blades 48 is disposed laterally offset relative to the longitudinal center line of the blade, toward the leading edge 64 thereof. Further, it will be seen that the blades comprise the inner horizontally disposed portion 66, the central downwardly sloping portion 67, and the outer horizontal cutting portion 68. The cutting portion 68 has its leading edge 68a beveled downwardly from approximately the line 69 to the leading edge. Further, the end of the cutting section 68 is upwardly beveled as at 71, oppositely, in effect, to the downwardly sloping bevel of the long edgewise cutting surface. In practice I find it desirable also to provide a sharpened, backwardly sloping edge 72 for the end of the blade adjacent the leading, beveled edge portion 68a. In practice I find that a blade so sharpened has therein a definite amount of "set," thus causing the blade when operating against large diameter trees to cut a definite chip from the growth, making the same in effect saw its way through the wood to be cut rather than shearing its way through.

By reference more particularly to Fig. 3 of the drawings, wherein the blades are shown in the position they assume when the disc is rotating at normal operating speed, it will be seen that centrifugal force will hold the blades outwardly. In fact, if the point X is assumed to be the center of mass of the blade, the blade will assume a position wherein the center of mass lies on the line 75 passing through the center or rotation of the disc and the pivot point afforded by the mounting bolt 51. The effect of this method of mounting the blade is to cause the leading edge 68a thereof when rotating to lie forwardly of the position which it would assume if the blade were mounted for pivotal movement along its longitudinal center line. Thus, when such a blade engages a piece of growth to be cut, rotation of the disc causes the blade to retract somewhat axially as the disc continues to rotate, thus sawing the tree or other growth against which the cutting edge is engaged. To take further advantage of this sawing action I may provide one or more semi-circular scarfs 68b in the cutting edge, the circular contours of which also are sharpened.

A further important portion of my invention and a portion which co-operates specifically with the blade carrying disc 46 and the pivoted blades will now be described. Secured to the underside of the deck plate 11, by any suitable means, such as by welding, is an arcuate, downwardly and rearwardly sloping collar or guard indicated generally by the numeral 73. The lower edge 73a of the collar is substantially at the level of the lower surface of the disc 46, there being provided merely enough clearance to permit unrestricted passage therebeneath of the blades 48. While the collar or guard may be of other forms, I prefer to make the same in the shape of a segment of a frustum of a cone with its larger diameter end secured to the body of the mower. The guard collar is placed on the front or leading side of the disc although, and as will later be pointed out, the same may be placed substantially completely around the disc to enclose it. However, in the towed type mower it is only necessary for the same to be placed on the front or advance side of the disc.

As best seen in Fig. 8 of the drawings the depending skirt 12, at the rear, rounded end of the mower is notched out as at 74. Disposed to fit over the notch, and to substantially close the major portion thereof is a curved closure plate 76. The plate 76 may be provided with bolt holes 77 matching with complementary bolt holes 78 in the skirt whereby the plate may be held in place by means of bolts or the like. The lower edge of the closure plate 76 may be scalloped as indicated at 79, whereby relatively large cut material may be discharged without raising the blade. Further, the bolt holes are so arranged that the plate 76 may be put in place with its straight edge downward, forming a continuation of the lower edge of the skirt, completely closing the opening 74.

From the foregoing the method of constructing and operating the form of my invention so far described may now be readily explained and understood. It will be appreciated that when the shaft 43 is rotated at sufficient speed the disc 46 is rotated, driving the blades 48 in circular paths. Centrifugal force causes the blades to stand out substantially radially, the off set mounting at the pivotal points thereof causing the leading edges 68a to lead slightly in the cutting direction. Thus, when the shaft 43 is driven in the direction of arrows 80, the blades rotate and engage and cut grass, brush, small diameter trees and the like since the blades project from beneath the forward end 13 of the mower body. Grass, vines, and small vegetation low enough to enter under the housing thus is cut by the blades and the rotating blades serve to shred the material in the housing. The importance of the opening 74 in the housing lies in the fact that by removing or replacing the cover plate 76 I can regulate to some extent the degree of shredding of the material by the blades. Thus, with the plate 76 removed a less amount of shredding is accomplished than when the plate is in place. This is due to the fact that material is retained in the housing longer if the opening 74 is partially closed than if it is completely open. With the plate 76 removed the material is discharged from the rear opening with a small amount of shredding action. I thus can regulate the shredding without changing the cutting height of the blades, and am enabled to cut very close to the ground leaving only short stumps, stubble or the like.

With the mower being pulled along over the ground it will be apparent that it may engage roots, rocks, local high places in the ground, stumps and the like. The guard collar 73 causes the entire mower body to ride up onto the stump, or other obstruction, whereby the rotating disc serves as a rotating skid surface and, may, for an instant, support the entire mower. Due to rotation of the disc and striking of the obstruction by the sides of the inner ends of the blades, the mower is smoothly and readily dislodged from such obstructions, preventing sudden shocks to the towing tractor and further preventing damage to the shaft 43, the disc, or the cutting blades. In actual practice I have found that a mower equipped with the combination of the disc, the pivoted blades, and the depending guard collar can be towed very smoothly over rough ground or ground in which stumps are being left from the cutting as compared to a mower not equipped with my improved guard. Furthermore, once the mower is dislodged from the obstruction in question it has been found that it is unlikely that the lower depending skirt 12 at the rear of the mower will engage the obstruction because by this time the blades will have cut or broken the obstruction so that the lower end of the skirt does not hang on the same. Furthermore, by removing the plate 76 I can provide a clearance space for clearing obstructions over which the mower may run, if that is necessary.

Referring now more particularly to Figs. 11, 12 and 13, I show a mower embodying most of the foregoing features except that these features are incorporated in a mower having a different form of body. In the embodiment shown in Figs. 11 to 13 I show a mower which may be mounted on the front of a tractor whereby the same may be pushed into large brush or the like over which the tractor itself cannot traverse and cuts the brush or the like either on movement directly into it or on somewhat lateral or turning movement.

In the drawings I show a mower embodying a body 81 which has a deck plate 82. The deck plate 82 is cut out along the curved lines 83 and 84 to provide a mower having a somewhat triangular body with a caster type supporting wheel 86 mounted adjacent the front end thereof. The wheel 86 is mounted on a supporting bracket 87 in turn mounted for rotation in a tubular bearing 88. The bearing 88 in turn is mounted by means of brackets 89 to an upstanding bracket 91 carried on the front end of the mower body. The rear end 92 of the body may be square, quite similar to the front end 13 of the mower body previously described.

The disc 46 and pivoted blade arrangement of the blades 48 may be identical with that already described. Likewise, the shaft 43 for rotating the disc as well as the drive means may be identical.

In view of the fact that the mower is disposed to move both backwardly and forwardly, I provide two of the protecting guards 73, thus substantially enclosing the periphery of the disc and protecting it against striking obstructions whether the mower is being pushed or pulled.

The mower may be provided with skids 23 substantially the same as already described and which may be secured to the mower body in any desired manner.

On the top side of the mower I may provide curved guard plates 93 which follow the curvature of the cut away sides 83 and 84. These plates serve to prevent injury to the operator of the tractor due to flying debris which may be kicked up by the blades since they project considerably past the outer periphery of the curved edges 83 and 84 of the housing.

From the foregoing it will be seen that the embodiment of the invention just described may be attached to a tractor by suitable hitch mechanism indicated diagrammatically at 94 and 96. With the mower thus hitched the same may be pushed into brush, the caster wheel 86 permitting ready guiding of the apparatus into the growth to be cut. The two guard brackets 73 serve to protect the shaft 43 and the disc 46 as well as the blades 48 in whatever direction the apparatus may be moved.

From the foregoing it will be apparent that I have devised an improved mower in which the shaft supporting the cutting mechanism is adequately protected at all times. Furthermore, by preventing shock to the cutting shaft the entire drive mechanism of the mower and the power output of the tractor is protected against damage, increasing the useful life of the apparatus. In actual practice and in operating mowers built in accordance with my invention in many types of terrain, I find that the same is far superior in operation to any comparable mower with which I am familiar. The guard brackets are fully effective to prevent bending the shaft 43 and in combination with the disc cause the mower readily to dislodge itself from the tops of stumps, and other obstruction. The mower shown in Figs. 11 and 12 may be attached either to the front of a tractor or pulled behind it. When connected behind the tractor the mower cuts similarly to the previous described machine. If growth is too large or dense for the tractor to pass over, the mower may be backed into such growth simply by reversing the direction of motion of the tractor and this may be done without any changes in the hitch.

While I have shown my invention in but two forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In mowing apparatus of the rotating disc type, a supporting structure comprising a hood having a flange along a substantial portion of its periphery, a drive shaft extending normally through said hood, a cutter supporting disc on the lower end of said shaft spaced below said hood, an inclined guard member extending downwardly from said hood and substantially concentric with at least the forward portion of said disc, at least two cutters extending outwardly from said disc and pivoted thereto, the pivot point of each cutter being off-set from its longitudinal center toward its leading edge.

2. Mowing apparatus as defined in claim 1 in which the supporting hood structure is generally triangular as viewed in plan, and in which the side edges of the body leading from the apex thereof are slightly concave as viewed in side elevation.

References Cited in the file of this patent

UNITED STATES PATENTS

| | | |
|---|---|---|
| 2,403,236 | Phelps | July 2, 1946 |
| 2,529,870 | Golasky | Nov. 14, 1950 |
| 2,578,880 | Doyle | Dec. 18, 1951 |
| 2,592,991 | Yeager et al. | Apr. 15, 1952 |
| 2,656,662 | Hines | Oct. 27, 1953 |